(12) United States Patent
Cook

(10) Patent No.: US 7,272,170 B2
(45) Date of Patent: *Sep. 18, 2007

(54) SINGLE OSCILLATOR TRANSCEIVER

(75) Inventor: Dean Lawrence Cook, Mesa, AZ (US)

(73) Assignee: U.S. Monolithics, L.L.C., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/275,932

(22) Filed: Feb. 6, 2006

(65) Prior Publication Data

US 2006/0135082 A1    Jun. 22, 2006

Related U.S. Application Data

(63) Continuation of application No. 10/059,465, filed on Jan. 28, 2002, now Pat. No. 6,996,165.

(60) Provisional application No. 60/264,384, filed on Jan. 26, 2001.

(51) Int. Cl.
*H04B 1/38* (2006.01)

(52) U.S. Cl. .................. 375/219; 375/306; 455/73; 455/76; 455/86; 455/318; 331/18

(58) Field of Classification Search ............... 375/219, 375/306; 455/76, 318, 86; 331/18
See application file for complete search history.

(56) References Cited

U.S. PATENT DOCUMENTS

| 5,239,685 | A | 8/1993 | Moe et al. |
| 5,307,029 | A | 4/1994 | Schenk |
| 5,937,335 | A | 8/1999 | Park et al. |
| 5,995,812 | A | 11/1999 | Soleimani et al. |
| 6,115,584 | A | 9/2000 | Tait et al. |
| 2004/0048588 | A1 | 3/2004 | Ammar et al. |

FOREIGN PATENT DOCUMENTS

WO    2004023675    3/2004

*Primary Examiner*—Dac Ha
*Assistant Examiner*—Ted M. Wang
(74) *Attorney, Agent, or Firm*—Snell & Wilmer L.L.P.

(57) ABSTRACT

A frequency plan is provided for particular use in a transceiver. Advantageously, a single oscillator may be used to generate desired frequency signal. One or more power splitters receive the signal and equally divide the signal into first and second signals having a frequency substantially equal to the original. Multipliers on each arm of the transceiver receive a signal and increase the frequency of the signal. Ultimately, multiple signals having different frequencies may be transmitted over the same cable due in part to the generated frequency separation between the signals. In one particular aspect, the frequency plan provides a two-thirds relationship between the frequencies of the multiple signals.

21 Claims, 4 Drawing Sheets

SINGLE OSCILLATOR TRANSCEIVER

CROSS-REFERENCE TO RELATED APPLICATIONS

This application is a continuation of and claims benefit of priority to U.S. Non-Provisional patent application Ser. No. 10/059,465, filed on Jan. 28, 2002 now U.S. Pat. No. 6,996,165, and also entitled "Single Oscillator Transceiver Frequency Plan", which application claims the benefit of, and priority to, provisional application Ser. No. 60/264,384, filed Jan. 26, 2001, which application is hereby incorporated by reference in its entirety.

FIELD OF INVENTION

The present invention relates, generally, to a system and method for a frequency plan, and in particular to a single oscillator frequency plan, and more particularly to a system and method for a single oscillator frequency plan configured to operate at frequencies below 3 GHz.

BACKGROUND OF THE INVENTION

In general, conventional transceiver frequency plans include two separate LOs (local oscillators) to drive mixers in the system and enable a wider range of frequency use. Multiple oscillators, however, are problematic. For example, oscillators have a tendency to drift (shift from the desired frequency range). A system containing two or more oscillators will experience a drift in each oscillator at a different rate unless it is phase locked to a reference frequency. Thus, the exact transmit frequency of the system can unknowingly vary, resulting in a need for constant sampling of the transmit local oscillator. Moreover, as is common with most electrical equipment, increasing the number of elements or components increases hardware costs and consumes valuable PWB (printed wire board) space.

Accordingly, an improved system and method for a frequency plan in a transceiver system is needed. Specifically, a system and method for a single oscillator transceiver frequency plan. In addition, a transceiver frequency plan operable at lower frequencies is needed.

BRIEF DESCRIPTION OF THE DRAWINGS

These and other features, aspects and advantages of the present invention will become better understood with reference to the following description, appending claims, and accompanying drawings where:

DETAILED DESCRIPTION

The subject matter of the invention is particularly suited for use in connection with complex mechanical and electrical systems, such as satellite communication systems. As a result, the preferred exemplary embodiment of the present invention is described in that context. It should be recognized, however, that such description is not intended as a limitation on the use or applicability of the present invention, but is instead provided merely to enable a full and complete description of a preferred embodiment.

An improved transceiver frequency plan system according to various aspects of the invention is disclosed. Generally, a frequency plan system of the exemplary embodiments mixes an IF (intermediate frequency) signal to a lower frequency range and separates the IF into, for example, two signals that are distant enough from each other that both signals may be transmitted on the same cable without signal interference from each other. In addition, a frequency plan system according to various embodiments may be configured to operate at desired frequencies, such as frequencies in the range where commonly available modem components are available.

Figure 1:
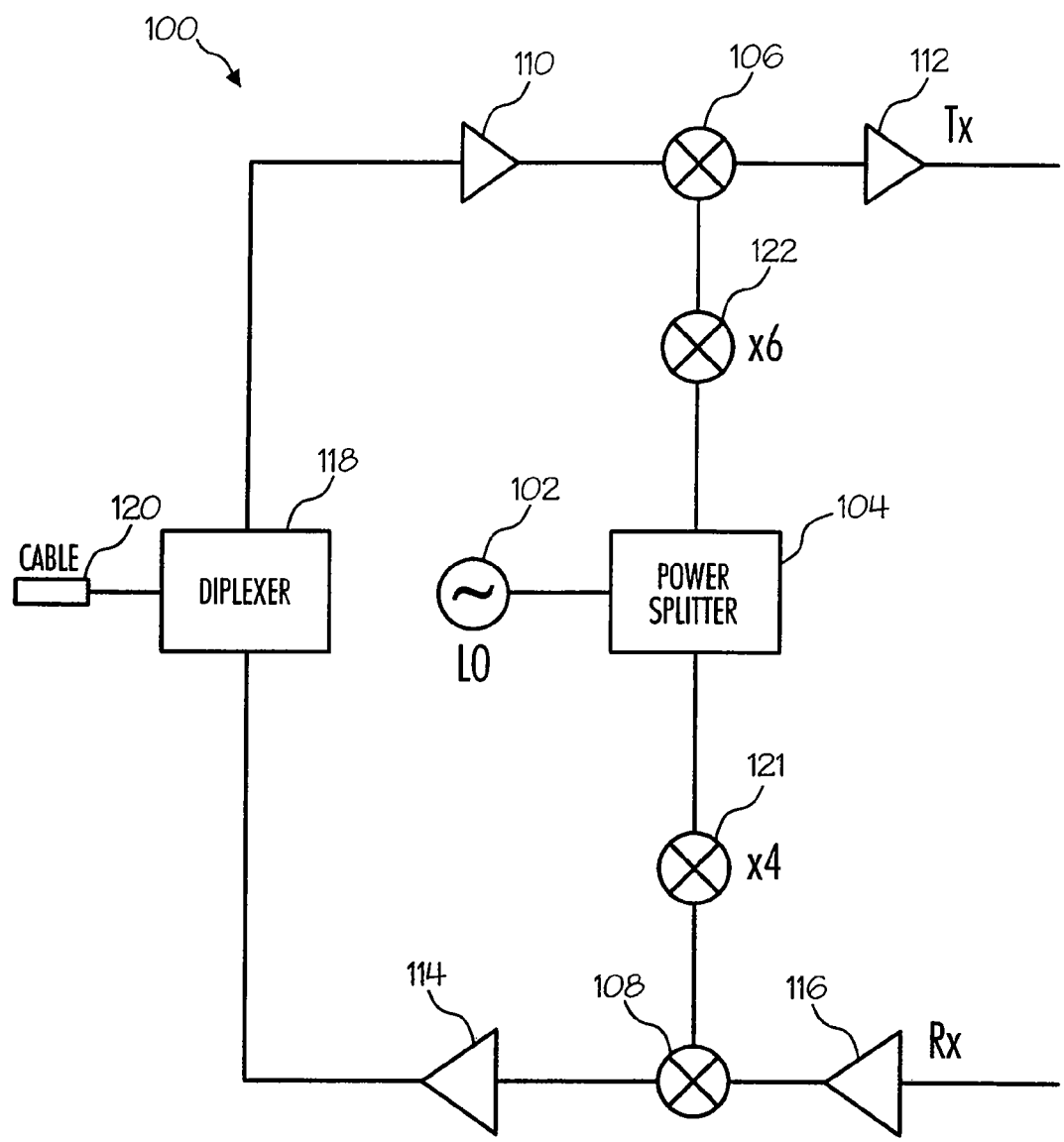
FIGS. 1 and 2 illustrate, in block format, transceiver systems implementing exemplary frequency plans in accordance with the invention.

FIG. 1 illustrates, in block format, a transceiver system 100 according to one embodiment of the invention. System 100 implements a frequency plan in accordance with the invention which generally includes a local oscillator (LO) 102, a power splitter 104, a plurality of mixers 106, 108, 121 and 122, a plurality of amplifiers 110-116, a diplexer 118, and a cable 120. The local oscillator 102 may comprise any suitable oscillator configured to generate a range of desired frequencies. In one preferred embodiment, implementation costs may be keep to a minimum by selecting a commonly available local oscillator. For example, currently, 5 and 10 GHz LOs are readily available at reasonable costs.

Power splitter 104 may comprise any suitable component or combination of components configured to divide a power signal into two or more signals. Additionally, the divided signals have a frequency equal to, or substantially equal to, the frequency of the original signal.

Multipliers 106, 108, 121 and 122 are each represented in FIG. 1 as a single element, however, it should be appreciated that each element merely demonstrates the function and is not intended to limit the scope to a single element. In fact, the multipliers may comprise several elements and/or stages of multiplication. Frequency multipliers (doublers) and their intended functions are well known in the industry and will not be discussed in detail.

In general, transmit multiplier, or mixer, 106 receives an IF signal from diplexer 118 and an LO signal from LO 102. Mixer 106 mixes the signals and produces a radio frequency (RF) signal that is either the sum or the difference of the IF and LO frequency signals. In a similar manner, receive mixer 108 combines a received RF signal with a received LO signal to produce an IF frequency signal.

One advantage of the invention is the ability to transmit multiple IF signals, having different frequencies, onto a single cable without risking interference among the signals. The unique frequency plan of the invention helps to enable this to occur by providing sufficient separation in frequency between the multiple IF signals to avoid interference. In various embodiments of the invention, a two-thirds (⅔) relationship between the IF signal frequencies is established. For example, one signal is multiplied to be four times the original LO frequency and a second signal is multiplied to be six times the LO frequency, thus a four-to-six, or two-thirds relationship between the signal frequencies.

In one particular embodiment of FIG. 1, multipliers 121 and 122 are configured to provide a two-thirds relationship between the frequencies of their respective signal outputs. Recall that power splitter 104 divides the original LO signal into substantially equal signals. In the present embodiment, power splitter 104 divides the received LO signal into two signals with each signal having substantially the same frequency as the original LO signal. One signal is received at multiplier 121 and the second signal is received at multiplier 122. In this particular exemplary embodiment, multiplier 122 may be configured to multiply the received signal by six and multiplier 121 may be configured to multiply the received signal by four. Therefore, a four-to-six or two-thirds relationship between the divided signals is established.

Amplifiers 110-116 may comprise any known or discovered amplification device(s) or element(s). Amplifiers 110 and 112 may include the "transmitting arm" of the system and amplifiers 114 and 116 may suitably include the "receiving arm" of the system. Typically there is some loss associated with transceiving systems of the type depicted in FIG. 1 and of particular use for the present invention. Amplifiers 110-116 are suitably configured to account for any signal loss and amplify the signals accordingly. Signal loss may be due to line loss, interference, signal splitting and combining, and various other causes well known in the communications industry.

In general, diplexer 118 enables the transmit and receive signals to be combined on the same cable. As previously stated, the frequency plan of the invention permits multiple signals of different frequency bands to be combined without causing interference among the separate signals. Diplexer 118 and its combining function are known in the industry and may be implemented as, for example, a pair of filters or a power divider that feeds separate filters.

Cable 120 comprises any suitable cable used for signal transmission. For example, a standard F connector with RG6 cable is well suited for this application. While various types of cables may be used, in general, low cost, readily available cable is often desirable. Currently, cables for signal transmission below 3 GHz are readily obtainable for low cost use such as home satellite communication applications. In this manner, another advantage of the invention relates to the ability to transmit multiple signals over a single cable with each signal transmitting at or below the desired 3 GHz.

In one particular application, transceiver system 100 is implemented in a ground satellite communication system comprising an outdoor unit and an indoor unit. In this application, cable 120 may extend from system 100, the outdoor unit, to an indoor unit having a detector and other various components.

Figure 2:
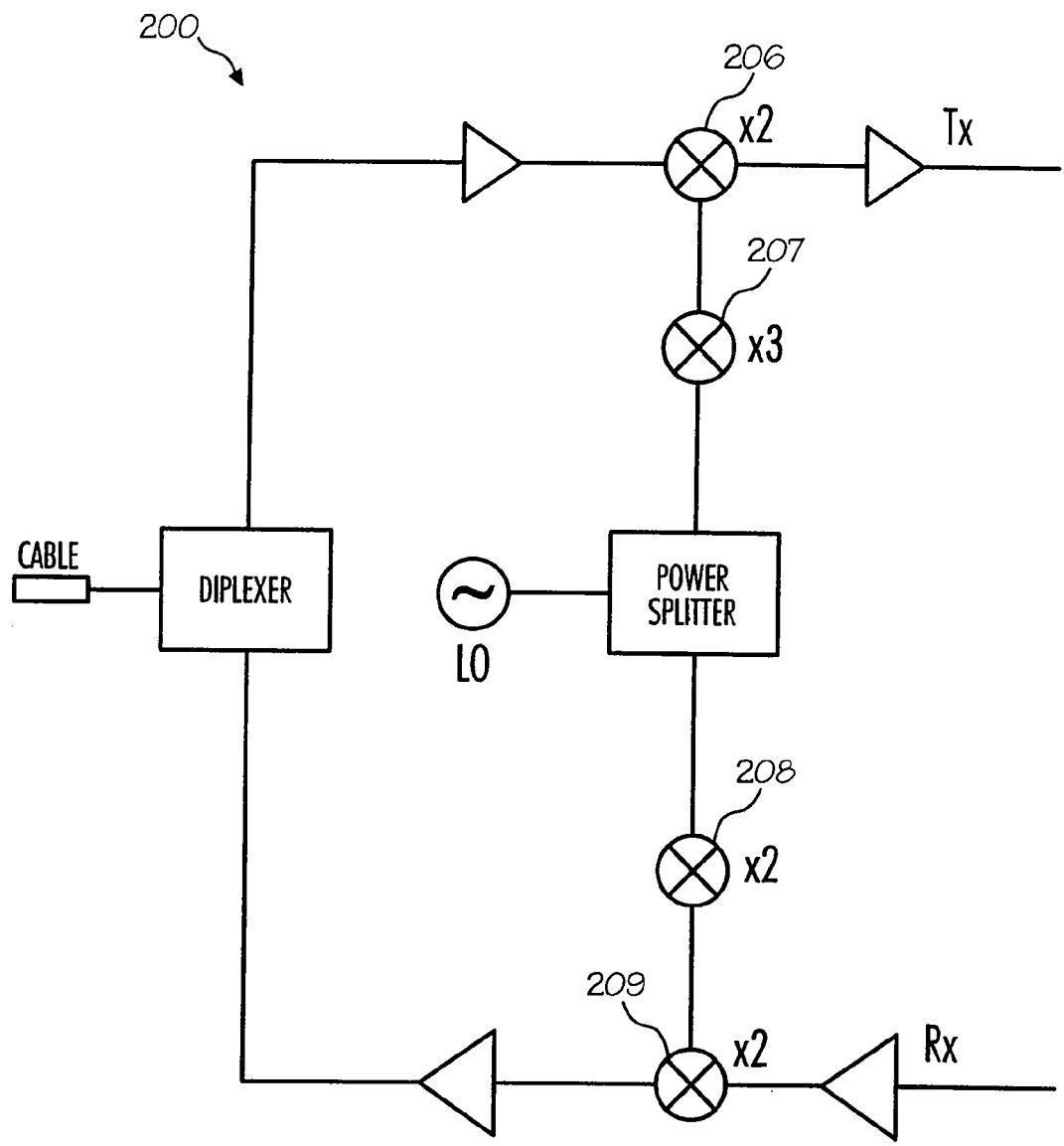

Referring now to FIG. 2, a transceiver system 200 in accordance with another embodiment of the invention is illustrated. System 200 includes substantially the same elements as system 100 of FIG. 1, except multipliers 121 and 122 of FIG. 1 are now depicted as multipliers 208 and 207 respectively, and mixers 106 and 108 are depicted as subharmonic mixers 206 and 209 respectively. As previously mentioned, the multipliers as described and illustrated herein, may comprise one or more elements or devices configured to multiply the received signal. For example, in this particular embodiment, multiplier 207 is suitably configured to multiply the received LO signal by three and subharmonic mixer 206 is suitably configured to further multiply the signal by 2. Thus, the divided signal from the original LO signal is now multiplied by 6. In a similar manner, multiplier 208 is suitably configured to multiply the original LO signal by two and subharmonic mixer 209 is suitably configured to further multiply the signal by two. Thus, the second divided signal from the original LO signal is multiplied by four. Thereby, establishing a two-thirds relationship between the two divided signals.

Figure 3:
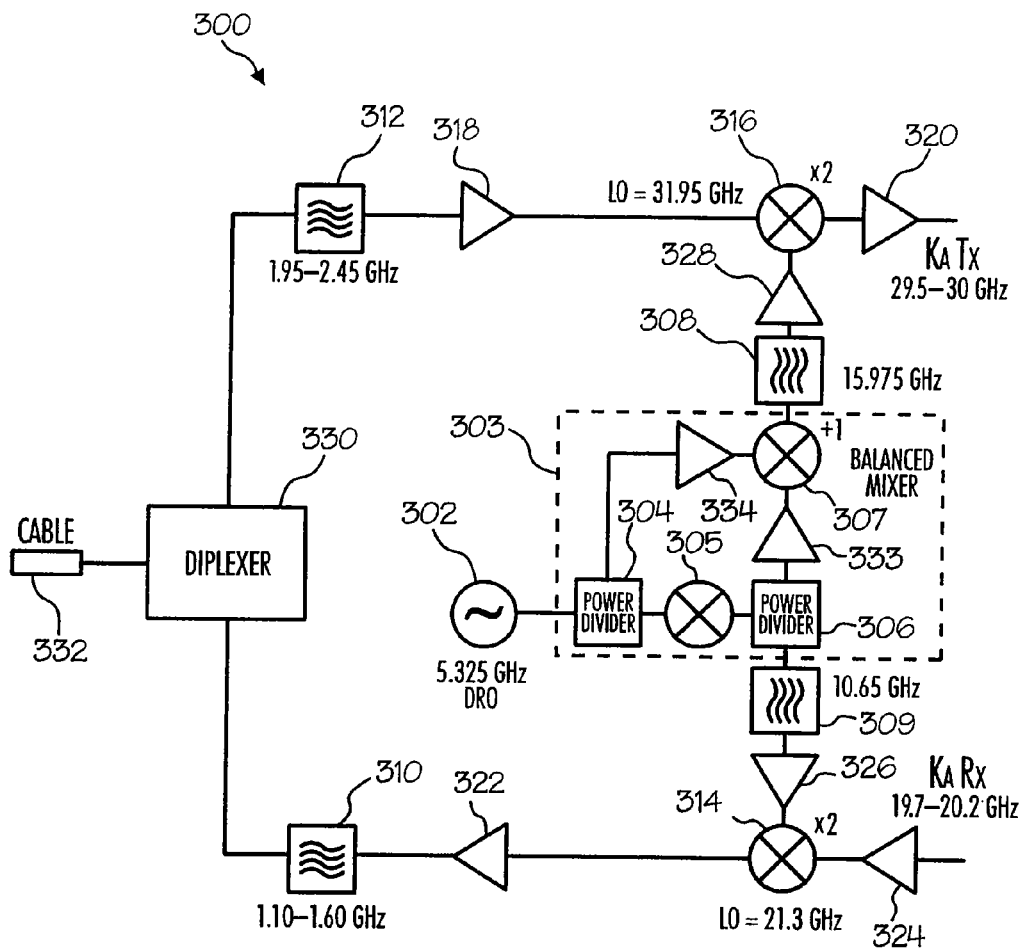
FIG. 3 illustrates, in block format, a transceiver system implementing an exemplary high side LO frequency plan in accordance with an embodiment of the invention.

FIG. 3 illustrates a transceiver system 300 in accordance with another embodiment of the invention. System 300 implements a transceiver frequency plan in accordance with the invention and, in this particular embodiment, a "high side" frequency plan is illustrated. In general, a high side frequency plan receives and transmits an RF (radio frequency) signal which is lower in frequency than the multiplied LO signal frequency. Conversely, a low side frequency plan receives and transmits an RF signal which is higher in frequency than the multiplied LO signal frequency. As will be discussed in further detail, both high and low side frequency plans may be used with the transceiver frequency plan of the invention.

System 300 includes substantially the same elements as exemplary systems 100 and 200, such as a local oscillator (LO) 302, a power splitter and multiplier 303, a plurality of filters 308-312, multipliers 314 and 316, a plurality of amplifiers 318-328, a diplexer 330, and a cable 332. Unlike the previous examples, system 300 and the embodied exemplary frequency plan is shown and described with specific frequency ranges. It should be noted that this description and range of frequencies is in no way intended to be limiting on the disclosure or applicability of the invention. Rather, the illustration and accompanying description are provided merely to assist in understanding the invention. As should be realized, numerous combinations of elements and/or desired frequency ranges may be used in a frequency plan of the invention without departing from the overall spirit of the invention.

In one particular embodiment, LO 302 may comprise a dielectric resonator oscillator (DRO) which is known in the industry. In the present exemplary embodiment, LO 302 may include a 5.325 GHz DRO which, as will be described below, is one example of an LO which enables the diplexed IF signals to be transmitted over cable 332 at a frequency less than 3 GHz. While 5.325 GHz is conveniently described herein, this embodiment is not intended to be limiting and, in fact, other LOs may be equally suited for the invention, e.g., 10 GHz LO.

Power splitter and multiplier 303 may be referenced as the "first stage" of power splitting and multiplying. In this embodiment, power splitter and multiplier 303 includes power dividers 304 and 306, multipliers 305 and 307, and amplifiers 333 and 334. Power dividers 304 and 306 are similar in function as previously described power splitter 104, and may comprise any suitable component or combination of components configured to divide a power signal into two or more signals having a power level equal to the original signal. Power divider 304 receives the LO signal (in this embodiment is a 5.325 GHz signal) and divides the signal into two substantially equal signals of 5.325 GHz each. One signal is received at multiplier 305 and the second signal is received at multiplier 307. In one particular embodiment, multiplier 305 multiplies the received signal by two, i.e., from 5.325 to 10.65 GHz. The multiplied signal is then divided by power divider 306 into two substantially equal (10.65 GHz) signals. One of the 10.65 GHz signals is received at mixer 307, which is preferably a balanced mixer, and the other 10.65 GHz signal is filtered. Mixer 307 adds the 10.65 GHz signal with a second 5.325 GHz signal received from power divider 304. Thus, power splitter and multiplier 303 receives a single LO signal and outputs two LO signals; one signal equal to two times the original LO signal (multiplied by two at multiplier 305) and one signal equal to three times the original signal (multiplied by two at multiplier 305 and mixed with a signal equal to the original signal at mixer 307). In this particular example, one signal is multiplied from 5.325 GHz to 10.65 GHz (two times) and the second signal is multiplied from 5.325 GHz to 15.975

GHz (three times). As mentioned earlier, it is common to experience some signal loss during power splitting and combining, therefore, amplifiers 333 and 334 are included to amplify the signal accordingly.

Filters 308 and 309 comprise any suitable bandpass filter. In general, filters are included to exclude spurious signals which commonly occur after mixing, splitting and/or dividing signals. Filters 308 and 309 suitably filter out spurs from the signals output from power splitter and mixer 303. The output of filter 308 (~15.975 GHz or three times the LO signal frequency) and the output of filter 309 (~10.65 GHz or two times the LO signal frequency) may be amplified by amplifiers 328 and 326 respectively to account for any power loss.

In this embodiment, system 300 is suitably configured to operate in the K band frequency range. As previously mentioned, to clearly understand the specific embodiment, a range of frequencies is provided. The receiving arm of the system may receive an RF signal in the frequency range of about 19 to 20 GHz and the transmitting arm of the system may transmit at a frequency range from about 29 to 30 GHz. These transmit and receive bands are of particular interest for some applications because they coincide with the FCC assigned Internet access bands.

Multiplier 314 receives a signal that is substantially two times greater in frequency than the original LO signal. In this embodiment, multiplier 314 is a doubler and thus the resulting signal is now four times greater than the original LO signal, i.e., ~21.3 GHz.

In a similar manner, multiplier 316 receives a signal that is substantially three times greater in frequency than the original LO signal. In this embodiment, multiplier 316 is a doubler and thus the resulting signal is now six times greater than the original LO signal, i.e., ~31.95 GHz. In one particular embodiment, the multipliers, such as multipliers 314 and 316, are subharmonic balanced mixers which provide LO rejection.

Multipliers 314 and 316 are additionally configured to present a roughly two-thirds (⅔) relationship between the two resulting signals. For example, in the present embodiment, the arm of the system containing multiplier 314 is configured to result in a signal that is four times the original LO signal and the other arm containing multiplier 316 is configured to result in a signal that is six times the original LO signal. Thus, a two-thirds (4/6) relationship exists between the two signals.

Filters 310 and 312 are configured to allow those signals to pass which represent the difference between the divided and multiplied LO signal and the transmitted RF signal. In this embodiment, the resulting signal from filter 312 is between 1.95 and 2.45 GHz (31.95 GHz-30 GHz; 31.95 GHz-29.5 GHz) and the resulting signal from filter 310 is between 1.1 and 1.6 GHz (21.3 GHz-20.2 GHz; 21.3 GHz-19.7 GHz). In this embodiment, the differences result in a signal frequency less than 3 GHz. This is a preferred situation due to the cable and industry standards. For example, in general, cables for transmitting signals in the frequency ranges of less than 3 GHz are currently less expensive, experience less loss and are readily available for a wide variety of uses, e.g., home communications.

Diplexer 330 and its function may be similar to diplexer 118 described herein.

Cable 332 comprises any suitable cable used for signal transmission and may be of the same type as described herein for cable 120.

Figure 4:
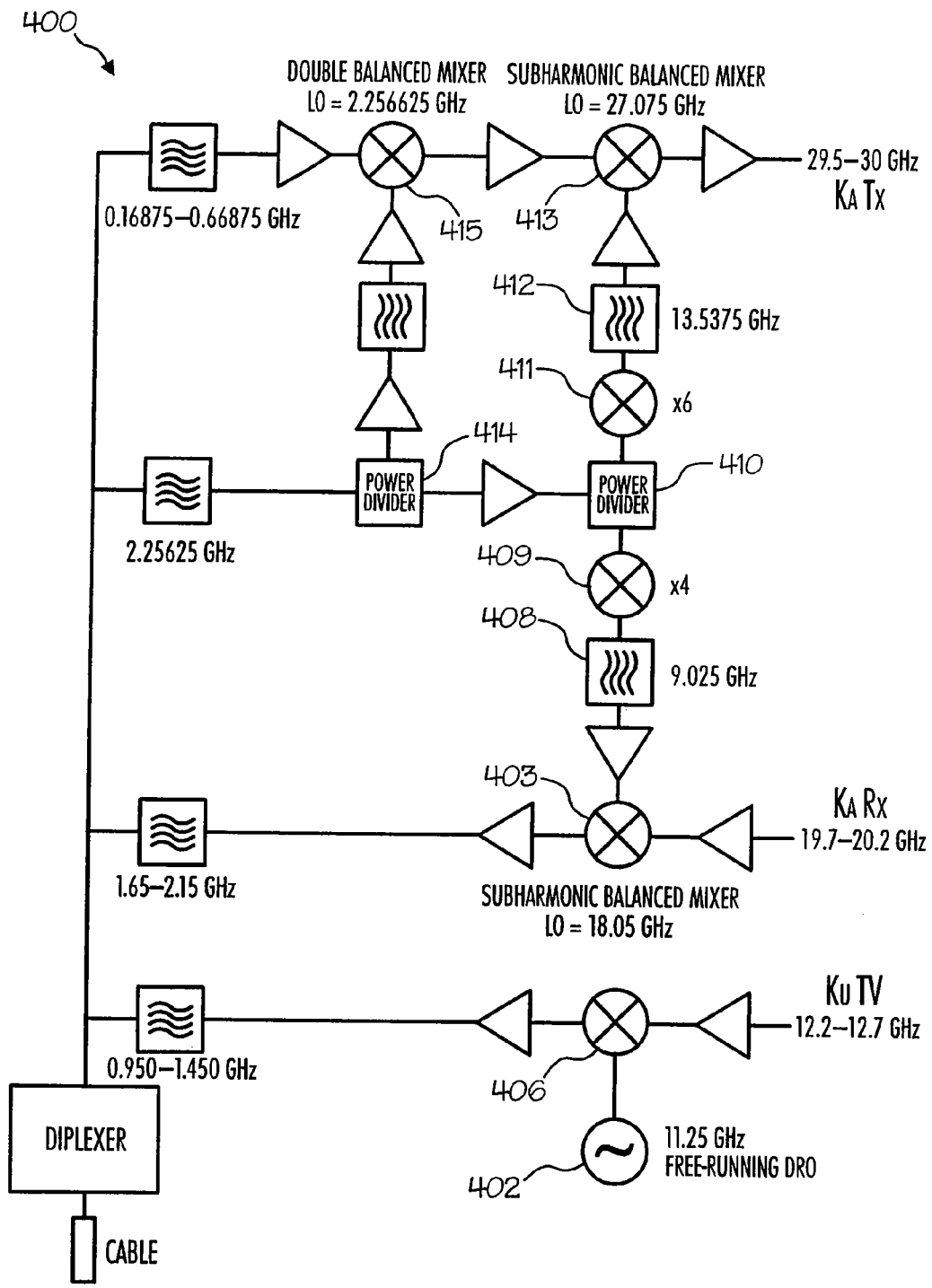
FIG. 4 illustrates, in block format, a transceiver system implementing an exemplary low side LO frequency plan in accordance with an embodiment of the invention.

Referring now to FIG. 4, a transceiver system 400 in accordance with another embodiment of the invention is illustrated. System 400 implements a transceiver frequency plan in accordance with the invention and, in this particular embodiment, a "low side" frequency plan is illustrated. The individual components of system 400 are similar in nature to those of system 300 implementing a high side frequency plan and thus will not be described again in detail. System 400, by industry definition, is a low side plan because the multiplied LO signal is less than the RF signal. It should be noted that each of the resulting signals received at the diplexer are less than 3 GHz.

Similar to the previous examples, system 400 includes an LO 402, a plurality of multipliers 403, 406, 409, 411, 413 and 415, power dividers 410 and 414, filters 408 and 412, and a plurality of amplifiers (not numerical referenced). Additionally, system 400 is operating in the K band frequency range, and in fact receives signals from multiple bands within the K band. In this particular illustration, one signal is received in the Internet access band and a second signal is received in the home satellite access band, e.g., dish network and direct TV. This example demonstrates the flexibility provided by a frequency plan of the invention. For instance, a dual up-convert with "tack-on" capabilities.

Again, it should be appreciated that system 400 is shown with exemplary frequency ranges for illustrative purposes only. The ranges provides are not intended to limit the scope of the invention, but merely to provide a numeric understanding of one particular frequency plan of the invention.

To fully understand the exemplary frequency plan of system 400, a brief explanation of the illustrative frequencies will follow. Mixer 406 may be implemented to produce an IF frequency signal that is the difference of the LO signal received from LO 402 and the received RF frequency signal. In this particular example, LO 402 may include a 11.25 GHz free-running DRO and the received RF signal may be in the KuTV band. Thus, the resulting IF signal falls within the desired frequency range of below 3 GHz.

While not depicted in the Figures, a communications system such as any of the systems 100, 200, 300 and 400 described herein may suitably include additional back end and front end systems which are generally well known in the communications industry, e.g., a signal detector, modem, and/or frequency counter. It should be appreciated that the particular implementations shown and described herein are illustrative of various embodiments of the invention including its best mode, and are not intended to limit the scope of the present invention in any way. For example, the systems and methods for frequency plans described herein were generated for the FCC licensed band as shown, but it should be appreciated that other frequency allocations may be used. For the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles. These and other changes or modifications are intended to be included within the scope of the present invention, as expressed in the following claims.

The invention claimed is:

1. A transceiver having a transmitted signal and a received signal, said transceiver comprising:
    a single oscillator configured to generate an oscillator signal at a desired frequency;
    a power splitter configured to receive said oscillatory signal and to divide said signal into first and second signals having a frequency substantially equal to said desired frequency of said oscillator signal;
    a first multiplier configured to receive said first signal and to increase the frequency of said first signal; and
    a second multiplier configured to receive said second signal and to increase the frequency of said second signal, such that the increased frequencies of said first and second signals represent a two-thirds relationship between the frequencies.

2. The transceiver of claim 1, wherein said transmitted signal and said received signal each comprise one of: K band frequencies, Ka band frequencies, FCC assigned internet access band frequencies, home satellite band frequencies, and KuTV band frequencies.

3. The transceiver of claim 1, wherein said transmitted and said received signals comprise different frequencies.

4. The transceiver of claim 1, wherein said transceiver is one of a high side transceiver and a low side transceiver.

5. The transceiver of claim 1, wherein one of said first and second multipliers is implemented as part of a sub-harmonic mixer configuration.

6. The transceiver of claim 5, wherein said single oscillator is a single free running oscillator and wherein said single free running oscillator is allowed to drift.

7. The transceiver of claim 1, wherein the relationship between the frequencies of said first and second signals is the ratio of the receive to transmit frequency conversion.

8. A ground satellite communication system, said system comprising:
    an indoor unit and an outdoor unit in communication with said indoor unit, said outdoor unit comprising a transceiver system having:
    a single oscillator, associated with a transceiver, configured to generate a first oscillator signal, wherein said transceiver is configured to divide said first oscillator signal into a second oscillator signal and a third oscillator signal, and wherein said transceiver is configured to perform frequency scaling to create a ⅔ relationship between the frequencies of said second oscillator signal and said third oscillator signal;
    a receiving section configured to utilize said second oscillator signal to facilitate frequency conversion in said receive section; and
    a transmitting section configured to utilize said third oscillator signal to facilitate frequency conversion in said transmit section.

9. The system of claim 8, said transceiver further comprising a first multiplier configured to scale the frequency of at least one of said second and third oscillator signals such that said second and third oscillator signals have different frequencies from each other.

10. The system of claim 8, said transceiver further comprising a sub-harmonic mixer configured to scale the frequency of at least one of said second and third oscillator signals such that said second and third oscillator signals have different frequencies from each other.

11. The system of claim 9, said transceiver further comprising a second multiplier configured to scale the frequency of at least one of said second and third oscillator signals, wherein one of said first and second multipliers is implemented as part of a sub-harmonic mixer configuration.

12. The transceiver of claim 8, wherein said transmitting section transmits a transmitted signal, wherein said receiving section receives a received signal, and wherein said transmitted signal and said received signal each comprise one of: K band frequencies, Ka band frequencies, FCC assigned internet access band frequencies, home satellite band frequencies, and KuTV band frequencies.

13. The transceiver of claim 8, wherein said transceiver performs one of a high side frequency conversion and a low side frequency conversion.

14. The transceiver of claim 8, wherein said single oscillator is a single free running oscillator and wherein said single free running oscillator is allowed to drift.

15. The transceiver of claim 8, wherein the relationship between the frequencies of said second and third oscillator signals is the ratio of the receive to transmit frequency conversion.

16. A signal transceiving method comprising the steps of:
    receiving a receive signal having a first frequency;
    receiving a transmit signal having a second frequency, wherein said first frequency is not equal to said second frequency;
    generating an oscillator signal from a single oscillator, associated with a transceiver;
    splitting said oscillator signal into a first signal and a second signal;
    scaling the frequency of said first signal to obtain a desired multiple of said first signal;
    scaling the frequency of said second signal to obtain a desired multiple of said second signal, wherein a ⅔ relationship exists between the scaled frequencies of said first signal and said second signal;
    mixing said transmit signal with the scaled version of said second signal to facilitate frequency conversion in a transmit section of said transceiver; and
    mixing said receive signal with the scaled version of said first signal to facilitate frequency conversion in a receive section of said transceiver.

17. The signal transceiving method of claim 16, wherein each of said scaling steps are performed using at least one of: a multiplier and a sub-harmonic mixer.

18. The signal transceiving method of claim 16, wherein said transmitting section transmits a transmitted signal, wherein said receiving section receives a received signal, and wherein said transmitted signal and said received signal each comprise one of: K band frequencies, Ka band frequencies, FCC assigned internet access band frequencies, home satellite band frequencies, and KuTV band frequencies.

19. The signal transceiving method of claim 16, wherein said transceiver performs one of a high side frequency conversion and a low side frequency conversion.

20. The signal transceiving method of claim 16, wherein said single oscillator is a single free running oscillator and wherein said single free running oscillator is allowed to drift.

21. The signal transceiving method of claim 16, wherein the relationship between the frequencies of said first and second signals is the ratio of the receive to transmit frequency conversion.

* * * * *